June 26, 1956  W. FERRIS  2,752,214
PISTON AND CONNECTING ROD ASSEMBLY
Filed April 16, 1953  2 Sheets-Sheet 1

INVENTOR
WALTER FERRIS
BY *Wesley P Merrill*
ATTORNEY

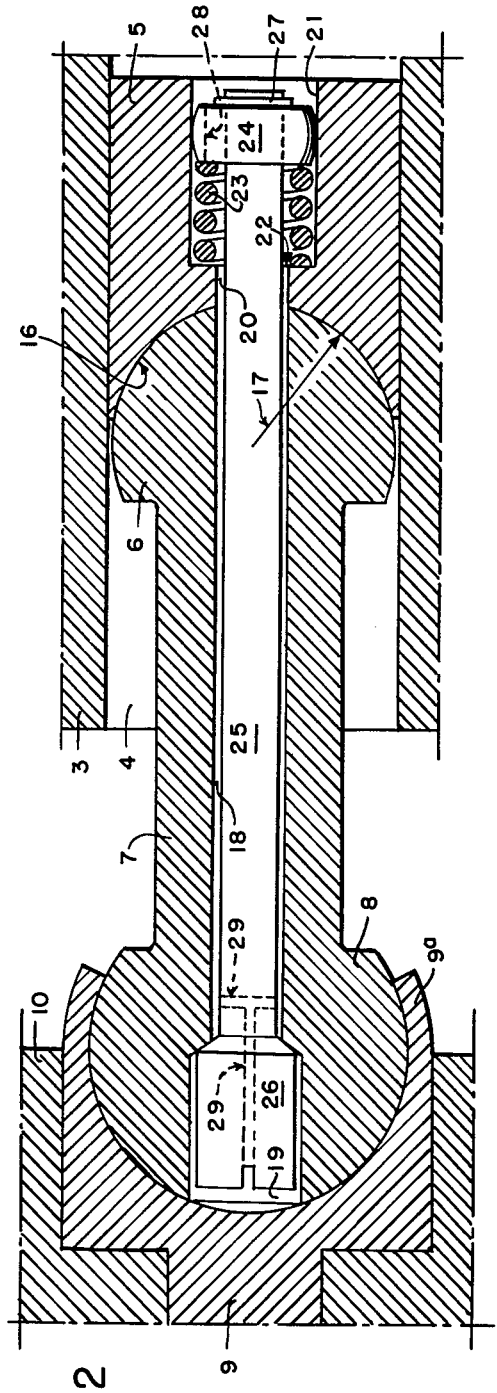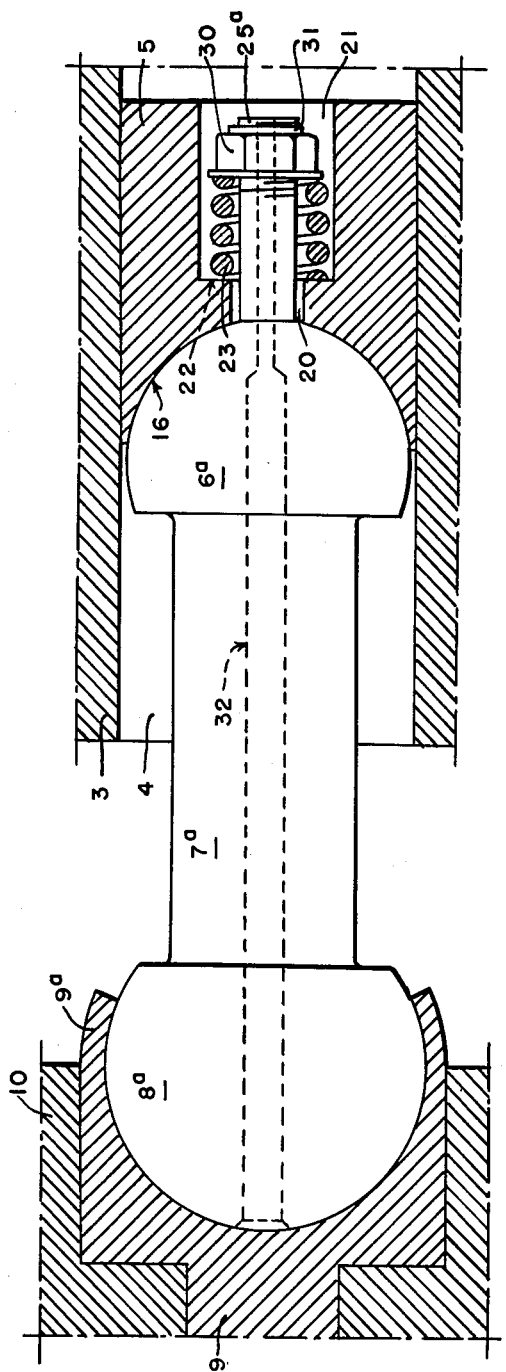

United States Patent Office 2,752,214
Patented June 26, 1956

2,752,214

PISTON AND CONNECTING ROD ASSEMBLY

Walter Ferris, Milwaukee, Wis., assignor to The Oilgear Company, Milwaukee, Wis., a corporation of Wisconsin Application April 16, 1953, Serial No. 349,169

14 Claims. (Cl. 309—20)

This invention relates to hydrodynamic machines of the type which will function as pumps when driven mechanically and will function as motors when supplied with motive liquid. More specifically, the invention relates to piston and connecting rod assemblies for such machines.

A piston and connecting rod assembly embodying the invention is particularly adapted for use in axial type hydrodynamic machines, such as swash plate type machines, angle type machines and wobble plate type machines, but it is not limited to such machines.

Since the function of a motor is substantially opposite to the function of a pump, the invention will be explained as being incorporated in a pump but it is to be understood that the invention is not limited to pumps and that piston and connecting rod assemblies embodying the invention are adapted for use in either pumps or motors.

The present invention has an object to provide a piston and connecting rod assembly which will enable a pump having relatively large cylinders to create very high pressures.

Another object is to provide a piston and connecting rod assembly having novel means for connecting the piston to the connecting rod.

Other objects and advantages will appear from the description hereinafter given of the embodiments of the invention illustrated in the accompanying drawings in which the views are as follows:

Fig. 2 is a longitudinal section through an embodiment of the invention and through certain pump parts adjacent thereto.

Fig. 3 is a view similar to Fig. 2 but showing different means for holding the piston and the connecting rod together.

Figure 1:
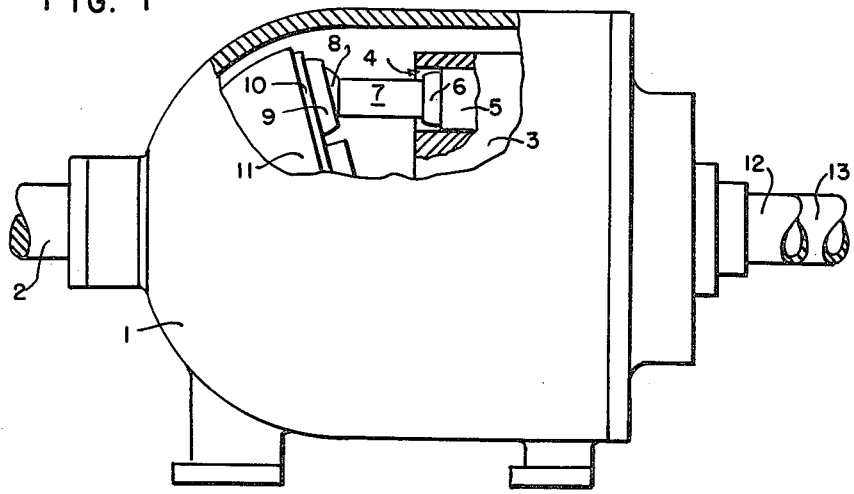
Fig. 1 is an elevation of a pump in which the invention is incorporated, a part of the pump casing and a part of the cylinder barrel being broken away to expose one of the piston and connecting rod assemblies.

For the purpose of illustration, the invention has been shown in Fig. 1 as being incorporated in a pump of the swash plate type but the invention may be incorporated in other types of pumps. With the exception of the piston and connecting rod assembly, the pump shown in Fig. 1 is substantially the same as the pump shown in Patent No. 1,020,285 so that only a brief description thereof is necessary.

The pump has its mechanism arranged within a casing 1 having a drive shaft 2 journaled therein. Shaft 2 has fixed for rotation therewith a cylinder barrel 3 having formed therein a plurality of axial cylinders 4 only one of which appears in the drawing. Each cylinder 4 has a piston 5 fitted therein and each piston 5 is held in contact with a spherical head 6 formed upon one end of a connecting rod 7 having a spherical head 8 formed upon its other end. Head 8 is fitted in a spherical socket 9 fixed to a thrust member 10 which is rotated in unison with cylinder barrel 3 by shaft 2 through a universal joint not shown. Thrust member 10 is rotatably supported within a cradle or reaction member 11 which is non-rotatable and is restrained from movement axially of shaft 2. Two pipes 12 and 13 are connected to casing 1 and communicate with a valve (not shown) which connects each cylinder to pipes 12 and 13 alternately during rotation of cylinder barrel 3.

The arrangement is such that, when thrust member 10 and cradle 11 are inclined to the axis of shaft 2 and cylinder barrel 3 and thrust member 10 are rotated, each piston 5 will be forced inward during one-half of each revolution of shaft 2 and will be drawn outward during the other half of each revolution of shaft 2. The inward moving pistons will eject liquid from their cylinders into one of the two pipes 12 and 13 and the cylinders containing outward moving pistons will be supplied with liquid from the other pipes 12 or 13.

In order to simplify the description, it will be assumed that the embodiments of the invention shown in Figs. 2, 3, 4 and 5 are incorporated in the pump shown in Fig. 1 but it is to be understood that the invention may be incorporated in other types of pumps.

As indicated in Fig. 2, connecting rod 7 has its head 6 fitted in a spherical seat 16 which is formed in the end of piston 5 and forms with head 6 a ball and socket joint. Connecting rod 7 has its head 8 fitted in a socket 9 which is fixed in thrust member 10 and forms with head 8 a ball and socket joint. Head 8 is retained within socket 9 by any suitable means such as a spherical cap fastened to the thrust member as is customary but for the purpose of illustration socket 9 has been shown as having an annular extension 9a which extends outward beyond the center of head 8 and is shaped into contact with the spherical surface of head 8 by a spinning operation or by a forming operation as is common practice.

Pumps in which each piston is connected to one end of a connecting rod by a ball and socket joint and has an axial passage extending therethrough to permit liquid to flow from the cylinder into the joint and form a lubricating film between the ball and the socket thereof have been extensively used for many years. The pumping force required to create pressure in the cylinder must be transmitted through the lubricating film between the ball and the socket and, if the force should become too high, the lubricating film would be squeezed out. The maximum pressure which can be created in the cylinder is thus determined by the ratio between the cross-sectional area of the piston and the cross-sectional area of the ball and socket joint.

In the prior pumps, both the ball and the socket are arranged entirely within the piston and the ball is retained in the socket by a spherical cap fixed to the piston so that the cross-sectional area of the ball is very much smaller than the cross-sectional area of the piston. Consequently, the unit pressure which can be created in the cylinder is only about one-half or less of the unit pressure which can be transmitted through the ball.

The present invention provides a piston and connecting rod assembly which enables a pump to create a pressure which is very much higher than the highest pressure that can be created by the prior pumps of the same type. This is accomplished by providing the connecting rod with a spherical head which is as large in diameter as possible, by providing the piston with a spherical seat complementary to the spherical surface on the head and by holding the seat in contact with the head by means of a rod or bolt.

As shown in Fig. 2, spherical seat 16 and the spherical surface on head 6 are formed upon a radius 17 which is very nearly as long as the radius of cylinder 4 and is struck from a center which is beyond the end of piston 5. For the sake of clarity, the annular edge around seat 16 on piston 5 has been shown as being of substantial thickness and a substantial clearance has been shown between head 6 and the wall of cylinder 4 but in practice the annular edge is quite thin and head 6 is made as large as possible without actually rubbing upon the wall of cylinder 4.

Connecting rod 7 has formed therein an axial passage 18 which is enlarged at one end to form a counterbore 19 within head 8. Passage 18 communicates with a passage 20 which is formed in piston 5 and is enlarged to form a spring chamber 21, the shoulder at the end of chamber 21 forming a spring seat 22.

Spherical seat 16 on piston 5 is held in contact with head 6 by a spring 23 arranged between seat 22 and a spring retainer 24 fixed on one end of a rod or elongated bolt 25 which extends loosely through passages 18 and 20 and is provided at its other end with an enlarged head 26 which is arranged within counterbore 19. Spring 23 compensates for variations in the angle between bolt 25 and the axis of piston 5 and is strong enough to hold seat 16 in contact with head 6 when piston 5 is accelerated at the start of its out-stroke. Spring means of the type shown in Fig. 2 is preferred but other spring means may be employed such, for example, as the spring means shown in Figs. 4 and 5.

Spring retainer 24 may be fixed upon bolt 25 in any suitable manner, such as being threaded thereon in which case a screw driver slot is formed in the end of bolt 25 or in its head 26, but it has been indicated as being held in position upon bolt 25 by a snap ring 27. In order to prevent the end of bolt 25 from wobbling about and from being moved radially by centrifugal force, spring retainer 24 has been shown as having a spherical surface on its periphery and as being slidably fitted in chamber 21.

In order to provide lubrication for both ball and socket joints, spring retainer 24 has one or more slots 28 formed therein and bolt 25 is provided with a duct 29 which extends axially inward from the end of its head 26 and then extends radially outward into communication with the space between the periphery of bolt 25 and the wall of passage 18. The arrangement is such that, when pressure prevails in cylinder 4, it will cause liquid to flow therefrom through slot 28, passages 20 and 18 and duct 29 into counterbore 19 and to maintain lubricating films of liquid between the mating surfaces of head 6 and seat 16 and between the mating surfaces of head 8 and socket 9.

*Fig. 3*

The piston and connecting rod assembly shown in this figure is substantially the same as the assembly shown in Fig. 2 except that the bolt for holding the piston and connecting rod together is fixed to the connecting rod instead of extending therethrough. Therefore, like parts have been indicated by like reference numerals and corresponding parts have been indicated by corresponding reference numerals with the exponent "a" added to the numerals applied to Fig. 3 so that only a brief description of the assembly is necessary.

As shown, the assembly includes a piston 5 which is fitted in a cylinder 4 formed in a cylinder barrel 3, a connecting rod 7ª which has formed on one end thereof a spherical head 6ª to engage the spherical seat 16 on piston 5 and has formed on the other end thereof a spherical head 8ª which is fitted in a socket 9 fixed to a thrust member 10, and a bolt 25ª which is fixed to or formed integral with head 6ª and extends through the passage 20 in piston 5 and into the spring chamber 21.

Piston 5 is held in contact with head 6ª by a spring 23 arranged around bolt 25ª between spring seat 22 and a spring retainer 30 which is fixed upon the end portion of bolt 25ª and shown as being a nut threaded thereon and prevented from backing away from spring 23 by a snap ring 31.

When cylinder barrel 3 and thrust member 10 are rotated and thrust member 10 is inclined to the axis of cylinder barrel 3 to thereby cause connecting rod 7ª to be reciprocated, head 8ª and piston 5 to be reciprocated, head 8ª will also move radially due to the fact that it travels in an elliptical path. Radial movement of head 8ª will cause head 6ª to rock upon seat 16 and the end of bolt 25ª to wobble about within chamber 21 but the movement of bolt 25ª is so small that spring retainer 30 will not contact the wall of chamber 21. As bolt 25ª wobbles, spring 23 will flex and compensate for variations in the angle between spring seat 22 and retainer 30.

Liquid for lubricating the mating surfaces of head 6ª and seat 16 is supplied thereto from cylinder 4 through chamber 21 and passage 20. Liquid for lubricating the mating surfaces of head 8ª and socket 9 is supplied thereto from cylinder 4 through a duct 32 which extends completely through connecting rod 7ª and bolt 25ª.

Figure 4:
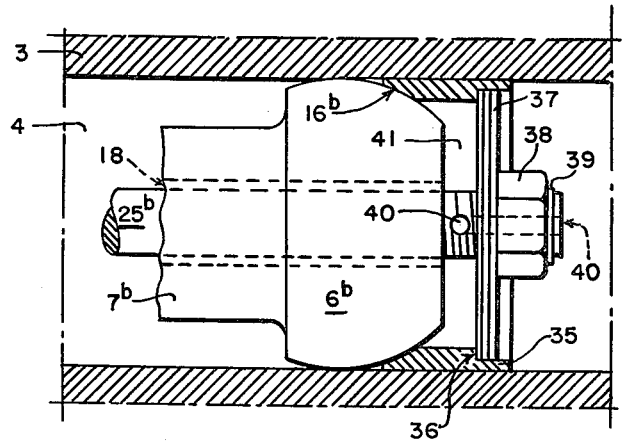
Fig. 4 is a view similar to the right hand portion of Fig. 2 but showing a modification of the assembly shown in Fig. 2.

*Fig. 4*

The piston and connecting rod assembly, of which only the right hand portion is shown in this figure, includes a connecting rod 7ᵇ which is the same as connecting rod 7 except that it has a spherical head 6ᵇ which is large enough in diameter to have a close sliding fit in cylinder 4, a tubular piston 35 which is closely fitted in cylinder 4 and has a spherical seat 16ᵇ and an annular spring seat 36 formed thereon, a rod or elongated bolt 25ᵇ which is similar to bolt 25, and suitable spring means to cooperate with seat 36 and bolt 25ᵇ and hold seat 16ᵇ in contact with the spherical surface of head 6ᵇ.

The arrangement is such that head 6ᵇ functions as the primary pumping piston and piston 35 functions primarily as a packing ring. Piston 35 also prevents undue wear of head 6ᵇ and prevents head 6ᵇ from being urged against the wall of cylinder 4 by centrifugal force.

Any suitable spring means may be employed such as a stack of spring washers 37 arranged between spring seat 36 and a suitable spring retainer shown as being a nut 38 threaded upon bolt 25ᵇ and prevented from backing away from washers 37 by a snap ring 39.

In order to provide lubrication between spherical seat 16ᵇ and head 6ᵇ and to provide lubrication for the spherical head 8 at the other end of connecting rod 7ᵇ, a small duct 40 extends axially inward from the right end of bolt 25ᵇ and then extends radially outward into communication with the space 41 between head 6ᵇ and washers 37. The arrangement is such that, when pressure prevails in cylinder 4, liquid will flow therefrom through duct 40 into space 41 and form a lubricating film between the mating surfaces of head 6ᵇ and seat 16ᵇ, and liquid will flow from space 41 through passage 18 and duct 29 (Fig. 2) to the ball and socket joint of the left end of connecting rod 7ᵇ. The piston and connecting rod assembly may otherwise be the same as that shown in Fig. 2.

Figure 5:
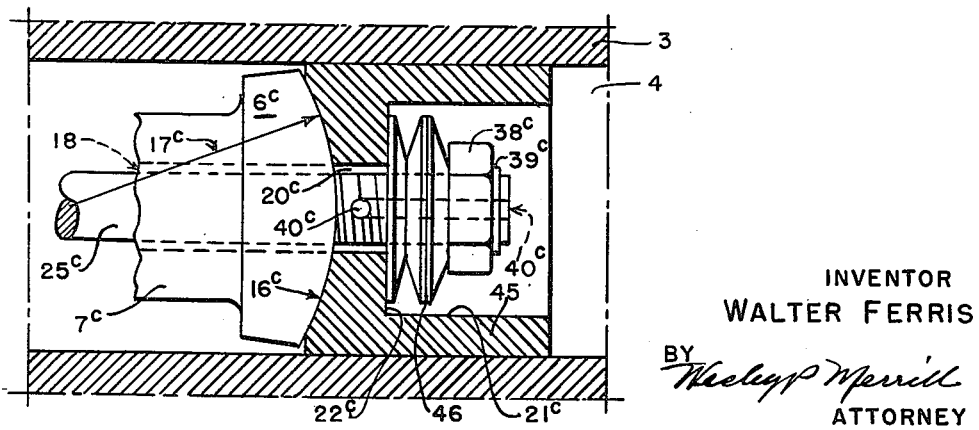
Fig. 5 is a view similar to Fig. 4 but showing another modification of the invention.

*Fig. 5*

This figure shows the right hand portion of a piston and connecting rod assembly the left hand portion of which may be the same as that shown in Fig. 2. The assembly includes a connecting rod 7ᶜ having a spherical head 6ᶜ formed upon one end thereof and engaged by a spherical seat 16ᶜ formed upon a piston 45 which is closely fitted in a cylinder 4. The assembly differs primarily from those shown in Figs. 2, 3 and 4 in that seat 16ᶜ and the spherical surface on head 6ᶜ are formed upon a radius 17ᶜ which is considerably longer than the radius of cylinder 4.

Piston 45 has formed therein an axial passage 20ᶜ which communicates at one of its ends with the passage 18 in connecting rod 7ᶜ and at the other of its ends with a spring chamber 21ᶜ, the shoulder at the junction of passage 20ᶜ and chamber 21ᶜ forming a spring seat 22ᶜ.

Piston 45 is held in contact with head 6ᶜ by suitable spring means such as a stack of Belleville washers 46 arranged between seat 22ᶜ and a nut 38ᶜ threaded upon the end of a rod or elongated bolt 25ᶜ which is like bolt 25ᵇ and extends through passages 20ᶜ and 18. Nut 38ᶜ is retained in position by a snap ring 39ᶜ and bolt 25ᶜ is provided with a lubrication duct 40ᶜ.

The invention set forth herein may be modified in various other ways without departing from the scope thereof. The invention is hereby claimed as follows:

1. In a hydrodynamic machine having a thrust member and a cylinder, the combination of a piston fitted in said cylinder and having a passage extending therethrough, a spherical seat formed in the end of said piston toward said thrust member, a connecting rod having a spherical head formed thereon to engage said spherical seat, a spring seat formed upon said piston in opposition to said spherical seat, a bolt carried by said connecting rod and extending through said passage and said seats, a spring retainer fastened upon said bolt, and spring means arranged between said spring seat and said retainer for holding said spherical seat in contact with said head.

2. A piston and connecting rod assembly according to claim 1 in which said spherical head is so large in diameter that it can not be arranged completely within said piston.

3. A piston and connecting rod assembly as set forth in claim 1 in which the spherical surfaces on said head and on said spherical seat have a radius which is nearly as long as the radius of said cylinder and is struck from a point outward from the end of said piston.

4. A piston and connecting rod assembly according to claim 1 in which said spherical head is large enough in diameter to have a close sliding fit in said cylinder and said piston functions primarily as a sealing ring.

5. A piston and connecting rod assembly according to claim 1 in which said spherical seat and the spherical surfaces on said head are formed upon a radius which is considerably longer than the radius of said cylinder.

6. In a hydrodynamic machine having a thrust member and a cylinder, the combination of a spherical socket carried by said thrust member, a piston fitted in said cylinder and having an axial passage, a spherical seat formed in the end of said piston toward said socket, a connecting rod having an axial passage extending completely therethrough, a first and a second spherical head formed upon opposite ends of said connecting rod to engage said socket and said seat respectively and form therewith a first and a second ball and socket joint, means for retaining said first head within said socket, a bolt extending through said passages and restrained from axial movement, and spring means associated with said bolt and said piston for enabling said bolt to urge said spherical seat against said second head with sufficient force to maintain contact therebetween during all normal conditions of operation of said machine.

7. A piston and connecting rod assembly as set forth in claim 6 in which said second spherical head is so large in diameter that it can not be arranged completely within said piston.

8. A piston and connecting rod assembly according to claim 6 including means for conducting liquid from said cylinder to both of said ball and socket joints to lubricate the same.

9. A piston and connecting rod assembly according to claim 6 in which said piston has formed therein a spring chamber and a spring seat within said chamber, said bolt is restrained from movement axially of said connecting rod, a spring retainer is fixed to one end of said bolt and is slidably fitted in said spring chamber to prevent any substantial radial movement of said end of said bolt by centrifugal force, and said spring means is arranged between said spring seat and said retainer.

10. A piston and connecting rod assembly according to claim 6 in which the passage in said connecting rod has a portion thereof within said first head enlarged to form a counterbore, said bolt has on one end an enlarged head arranged within said counterbore and has spring retaining means fixed upon its other end to engage said spring means, and said bolt has a duct extending axially through its head and then extending radially outward into communication with said passage to permit liquid to flow from said cylinder into said counterbore.

11. A piston and connecting rod assembly as set forth in claim 6 in which said second head is large enough to have a close sliding fit in said cylinder and said piston functions primarily as a sealing ring.

12. A piston and connecting rod assembly as set forth in claim 6 in which the spherical seat on said piston and the spherical surface on said second head are formed upon a radius which is considerably longer than the radius of said cylinder.

13. In a hydrodynamic machine having a cylinder open at the front end thereof, the combination of a piston fitted in said cylinder and having a passage extending therethrough, a spherical seat formed in the front end of said piston concentric with said passage, an annular seat formed upon said piston rearward from said spherical seat and around said passage, a connecting rod having a spherical head complementary to and in engagement with said spherical seat, said head being so large in diameter that it can not be arranged completely within said piston, a bolt extending through said passage and restrained from rearward movement by said rod, and means on said bolt and cooperating with said annular seat for holding said head in engagement with said spherical seat.

14. A piston and connecting rod assembly as set forth in claim 13 in which the spherical surfaces on said head and on said spherical seat have a radius which is nearly as long as the radius of said cylinder and is struck from a point outward from the end of said piston.

References Cited in the file of this patent

UNITED STATES PATENTS

| | | |
|---|---|---|
| 2,329,480 | Neuland | Sept. 14, 1943 |
| 2,365,067 | Gauld | Dec. 12, 1944 |
| 2,500,669 | Doeg | Mar. 14, 1950 |
| 2,638,850 | Ferris | May 19, 1953 |

FOREIGN PATENTS

| | | |
|---|---|---|
| 105,085 | Great Britain | Apr. 5, 1917 |
| 266,184 | Italy | July 22, 1929 |
| 970,693 | France | Jan. 8, 1951 |
| 870,317 | Germany | Mar. 12, 1953 |